(12) United States Patent
Smith et al.

(10) Patent No.: US 7,454,337 B1
(45) Date of Patent: Nov. 18, 2008

(54) METHOD OF MODELING SINGLE DATA CLASS FROM MULTI-CLASS DATA

(75) Inventors: David C. Smith, Columbia, MD (US); Daniel J. Richman, Baltimore, MD (US)

(73) Assignee: The United States of America as represented by the Director, National Security Agency, The, Washington, DC (US)

( * ) Notice: Subject to any disclaimer, the term of this patent is extended or adjusted under 35 U.S.C. 154(b) by 703 days.

(21) Appl. No.: 10/847,677

(22) Filed: May 13, 2004

(51) Int. Cl.
*G10L 15/08* (2006.01)

(52) U.S. Cl. ........... 704/240; 704/243; 704/245; 704/244

(58) Field of Classification Search ......... 704/231, 704/238, 240, 244, 245, 256, 232, 243, 246, 704/250
See application file for complete search history.

(56) References Cited

U.S. PATENT DOCUMENTS

| | | | |
|---|---|---|---|
| 5,598,507 A * | 1/1997 | Kimber et al. | 704/246 |
| 5,623,539 A | 4/1997 | Bassenyemukasa et al. | |
| 5,659,662 A | 8/1997 | Wilcox et al. | |
| 6,332,122 B1 | 12/2001 | Ortega et al. | |
| 6,404,925 B1 | 6/2002 | Foote et al. | |
| 6,411,930 B1 | 6/2002 | Burges | |
| 6,424,935 B1 | 7/2002 | Taylor | |
| 6,535,848 B1 | 3/2003 | Ortega et al. | |

OTHER PUBLICATIONS

Bonastre, J.-F.; Delacourt, P.; Fredouille, C.; Merlin, T.; Wellekens, C.; "A speaker tracking system based on speaker turn detection for NIST evaluation" Acoustics, Speech, and Signal Processing, 2000. ICASSP '00. Proceedings. 2000 IEEE International Conference.*
Man-Hung Siu et al., "An Unsupervised, Sequential Learning Algorithm for the Segmentation of Speech Wave Forms With Multiple Speakers," IEEE, 1992 pp. II-189-II-192.

* cited by examiner

*Primary Examiner*—Huyen X. Vo
(74) *Attorney, Agent, or Firm*—Robert D. Morelli

(57) ABSTRACT

The present invention is a method of modeling a single class of data from data containing multiple classes of data of the same type of data by first receiving a collection of data that includes data from multiple classes of data of the same type where the amount of data of the single class of data exceeds that of any other class of data. A first statistical model of the received collection of data is generated. The collection of data is divided into subsets. Each subset of the speech collection of data is scored using the first statistical model. A set of scores is selected. The subsets corresponding to the selected scores are identified. The identified subsets are combined. A second statistical model of the type of the first statistical model is generated for the combined subsets and used as the model of the single class of data.

11 Claims, 2 Drawing Sheets

METHOD OF MODELING SINGLE DATA CLASS FROM MULTI-CLASS DATA

FIELD OF THE INVENTION

The present invention relates, in general, to data processing and, in particular, to generating a specialized model for a single data class from multi-class data.

BACKGROUND OF THE INVENTION

There are many instances where data includes data of different classes within a particular category (e.g., speech, images, text). In speech applications, examples of multi-class data include data of a speaker of interest and other speakers, speech from both genders, speech in multiple languages, and so on. Prior art methods model a particular class of data using either data of just the particular class or data of the particular class that is contaminated with data from other classes. In some instances, it might be impossible to acquire data of just the class of interest, and models generated from contaminated data are less effective than models generated using data from only a class of interest. So, there is a need to model a user-definable class of data using data that includes the user-definable class of data and at least one other class of data, where the contaminating effects of the classes of data that are not of interest are eliminated. The present invention is just such a method.

Speech sounds result when air from the lungs is forced through the glottis, producing resonances in the vocal tract, which occur at different frequencies. Locations of peaks in the magnitude spectrum of a speech sound, called formants, occur at the resonant frequencies of the vocal tract and are related to the configuration of the vocal tract at the time the speech sound was produced. Differences exist between the vocal tracts of different people, resulting in differences in spectral location and magnitude of formants from speaker to speaker. These differences are used for various speech processing applications (e.g., speech recognition, gender identification, speaker recognition, language identification). Popular statistical modeling methods for speech processing applications include the Hidden Markov Model (HMM), the Buried Markov Model (BMM), and the Gaussian Mixture Model (GMM).

Prior art methods of speaker recognition typically involve a modeling process in which a speaker of interest provides a high quality sample of speech, where the sample is not corrupted by the speech of another person or by noise. Next, a statistical model is generated from the sample using one of the available statistical modeling methods. The model may then be used to determine whether or not the speaker of interest uttered a subsequently provided high quality speech sample. This sample of unknown origin is scored against the model generated for the speaker of interest. If the sample of unknown origin scores sufficiently high against the model then the sample of unknown origin is declared to have been spoken by the speaker of interest. Such a method works fine when the speakers voluntarily provide pristine speech samples. However, there are many applications where a speaker of interest would not voluntarily provide a speech sample, where a speech sample obtained is not pristine, but contaminated with either noise or speech from one or more other speakers. When the speech sample is contaminated with speech from other speakers, the prior art method described here does not provide an optimal solution.

In an article entitled "An Unsupervised, Sequential, Learning Algorithm for the Segmentation of Speech Waveforms with Multiple Speakers," by Man-Hung Siu et al., IEEE, 1992, pps. 189-192, a method was disclosed for segmenting speech containing multiple speakers into segments of individual speakers without any prior knowledge (i.e., no training data). The method includes the steps of generating a spectral representation of the speech signal in order to identify acoustic segments within the speech signal. Next, a mean and outer product of cepstral vectors are computed for each acoustic segment identified. Next, acoustic segments that represent noise are identified based on the amount of energy present in each segment. Next, the contiguous speech segments are grouped into larger segments. Next, a distance matrix is formed for each acoustic segment. Next, the segments are clustered according to their distance matrix, where each cluster represents an individual speaker. The present method does not identify noise segments, group contiguous segments, or cluster segments as does Siu et al.

U.S. Pat. No. 5,598,507, entitled "METHOD OF SPEAKER CLUSTERING FOR UNKNOWN SPEAKERS IN CONVERSATIONAL AUDIO DATA," discloses a method of identifying each speaker in data containing multiple speakers by dividing the data into segments, determining the distance between each pair of segments, combining segments between which there is no significant distance, declaring the remaining separate segments to each contain speech from only one speaker, and forming a model of each separate segment to represent each of the individual speakers. The present invention does not identify each unique speaker in speech data as does U.S. Pat. No. 5,598,507. U.S. Pat. No. 5,598,507 is hereby incorporated by reference into the specification of the present invention.

U.S. Pat. No. 5,623,539, entitled "USING VOICE SIGNALS ANALYSIS TO IDENTIFY AUTHORIZED USERS OF A TELEPHONE SYSTEM," discloses a device for and method of determining if an authorized user is using a telephone by separating speech from noise in a multi-party speech signal. Then, the speech of each speaker is separated according to the method of Siu et al. described above. Then, each person's speech data is compared to speech data of authorized users. If an authorized user is detected then the conversation is allowed to proceed. Otherwise, corrective action is taken. The present invention does not use the method of Siu et al. to identify each speaker in speech data. U.S. Pat. No. 5,623,539 is hereby incorporated by reference into the specification of the present invention.

U.S. Pat. No. 5,659,662, entitled "UNSUPERVISED SPEAKER CLUSTERING FOR AUTOMATIC SPEAKER INDEXING OF RECORDED AUDIO DATA," discloses a device for and a method of identifying each speaker in data containing multiple speakers by dividing the data into segments, determining the distance between each pair of segments, combining segments between which there is no significant distance, declaring the remaining separate segments to each contain speech from only one speaker, and forming a model of each separate segment to represent each of the individual speakers. The present invention does not identify each unique speaker in speech data as does U.S. Pat. No. 5,659,662. U.S. Pat. No. 5,659,662 is hereby incorporated by reference into the specification of the present invention.

U.S. Pat. No. 6,332,122, entitled "TRANSCRIPTION SYSTEM FOR MULTIPLE SPEAKERS USING AND ESTABLISHING IDENTIFICATION," discloses a device for and method of transcribing the speech of multiple speakers by assigning a speaker identification number to the first speaker. The speech signal is continuously monitored for a change of speaker, using a conventional method of determining whether or not additional speech came from the speaker to which the current identification number was assigned. If the speaker remains the same, the speech is transcribed. If a change of speaker is detected then it is determined whether or not the present speaker has been enrolled or not. If so, the identification number assigned when the speaker enrolled is noted. Otherwise, the speaker is enrolled and assigned an identification number. Speech is then transcribed until another change of speaker is detected. The present invention does not assign an identification number to the first speaker in a signal, continuously monitor the speech for changes in speaker, and take the action described above as does U.S. Pat. No. 6,332,122. U.S. Pat. No. 6,332,122 is hereby incorporated by reference into the specification of the present invention.

U.S. Pat. No. 6,404,925, entitled "METHODS AND APPARATUSES FOR SEGMENTING AN AUDIO-VISUAL RECORDING USING IMAGE SIMILARITY SEARCHING AND AUDIO SPEAKER RECOGNITION," discloses a device for and method of segmenting an audio-visual presentation by presentation and identifying the number of speakers. It is presumed that only one person speaks during a presentation, but that one person may give more than one presentation. The first step is to segment the recording according to changes in slides presented during the presentation. Next, the audio associated with each identified slide is extracted. The audio segments are clustered to determine the number of speakers. The clusters are then used as training data for segmenting speakers. The present invention does not use video to segment speakers or clustering to determine the number of speakers as does U.S. Pat. No. 6,404,925. U.S. Pat. No. 6,404,925 is hereby incorporated by reference into the specification of the present invention.

U.S. Pat. No. 6,411,930, entitled "DISCRIMINATIVE GAUSSIAN MIXTURE MODELS FOR SPEAKER VERIFICATION," discloses a device for and method of speaker identification for multiple speakers using a single Gaussian Mixture Model (GMM) that is modified to include an output of a Support Vector Machine (SVM), where the SVM was trained to distinguish each speaker for which the GMM is used. The present invention does not use a GMM modified by a SVM that is trained to identify each speaker for which the GMM is used as does U.S. Pat. No. 6,411,930. U.S. Pat. No. 6,411,930 is hereby incorporated by reference into the specification of the present invention.

U.S. Pat. No. 6,424,935, entitled "TWO-WAY SPEECH RECOGNITION AND DIALECT SYSTEM," discloses a device for and method of converting speech to text for multiple speakers by recording the speech pattern of the first speaker, storing transcribed speech, and comparing the vocal pattern to dialect records. If a match is found, the vocal pattern is associated with the transcribed speech and dialect record. The present invention does not compare vocal patterns to dialect records as does U.S. Pat. No. 6,424,935. U.S. Pat. No. 6,424,935 is hereby incorporated by reference into the specification of the present invention.

U.S. Pat. No. 6,535,848, entitled "METHOD AND APPARATUS FOR TRANSCRIBING MULTIPLE FILES INTO A SINGLE DOCUMENT," discloses a device for and method of transcribing speech from multiple speakers into multiple files by recording each speaker using a separate recording device for each speaker. The present invention does not identify each speaker by using a separate recording device for each speaker as does U.S. Pat. No. 6,535,848. U.S. Pat. No. 6,535,848 is hereby incorporated by reference into the specification of the present invention.

SUMMARY OF THE INVENTION

It is an object of the present invention to generate a model of one class of data from a collection of data that contains multiple classes of data within a particular category of data in which the total amount of the one class of data exceeds that of any other class of data in the collection of data.

It is another object of the present invention to generate a model of one speaker from data containing multiple speakers in which the total speech time of the one speaker exceeds that of any other speaker in the data.

It is another object of the present invention to generate a model of one speaker from data containing multiple speakers in which the total speech time of the one speaker exceeds that of any other speaker in the data using a Gaussian Mixture Model.

It is another object of the present invention to generate a model of one gender of speech from data containing both genders of speech in which the total speech time of the one gender of speech exceeds that of any other gender of speech in the data.

It is another object of the present invention to generate a model of one language of speech from data containing speech in multiple languages in which the total amount of speech in the one language exceeds that of the speech in any other language in the data.

The present invention is a method of modeling a class of data from data containing multiple classes of data.

The first step of the method is receiving data that includes data of multiple classes of the same type in which a total amount of data in the single class exceeds that of any other class in the data.

The second step of the method is generating a first statistical model of the received multi-class data.

The third step of the method is selecting a user-definable number of subsets of the multi-class data.

The fourth step of the method is scoring each subset of the multi-class data using the first statistical model.

The fifth step of the method is selecting a set of scores from the fourth step.

The sixth step of the method is identifying the subsets in the multi-class data that correspond to the selected scores.

The seventh step of the method is combining the subsets identified in the sixth step.

The eighth step of the method is generating a second statistical model from the result of the seventh step as the model of the single class of data.

DETAILED DESCRIPTION

The present invention is a method of modeling a class of data from a collection of data that contains the class of data and at least one other class of data of the same type of data (e.g., speech, images, text). In speech applications a class of interest includes a speaker of interest, a gender of interest, and a language of interest. Such a method is desirable when pristine data from a class of interest is unattainable. The present invention is useful in various speech applications such as speaker recognition, gender identification, and language recognition.

Figure 1:
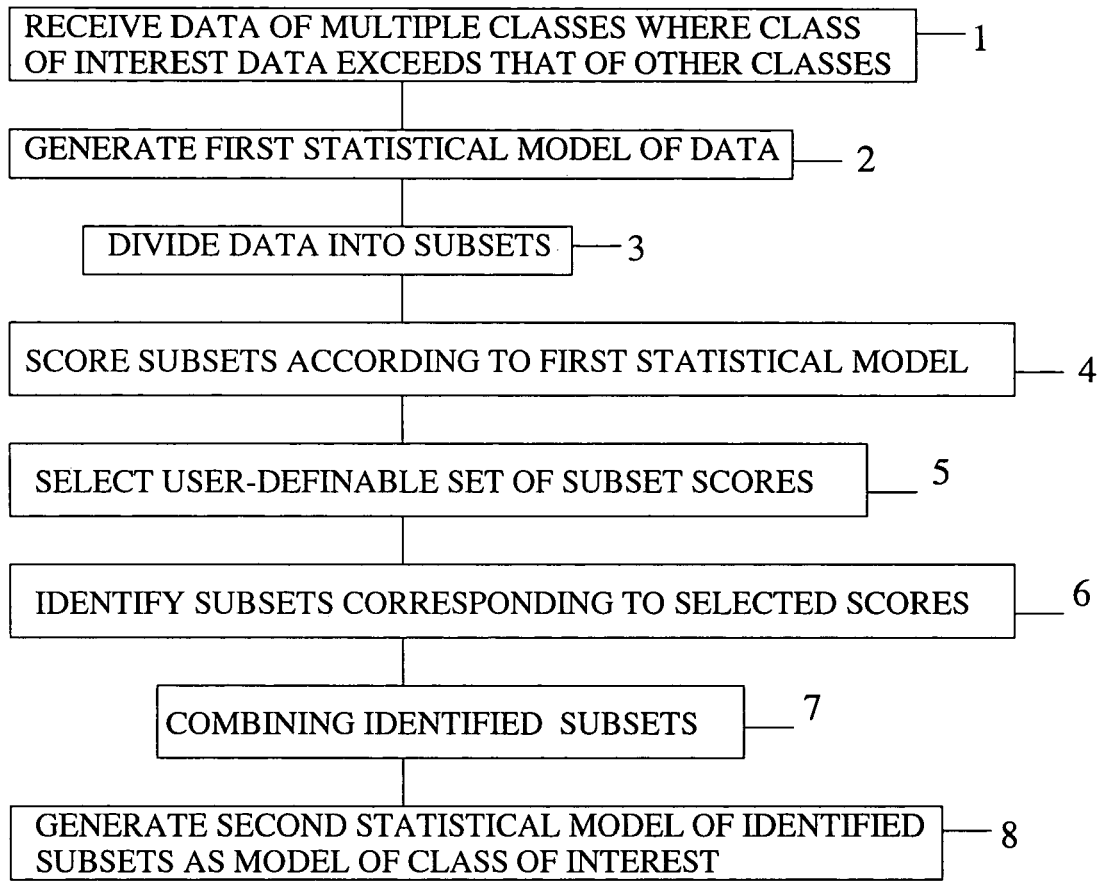
FIG. 1 is a list of the steps of the present invention.

FIG. 1 is a list of steps of the present method.

The first step 1 of the method is receiving a collection of data that includes data from a class of interest (e.g., speaker, gender, language) and one or more other classes. The total amount of data belonging to the class of interest in the collection of data must exceed that of any other class of data in the collection.

The second step 2 of the method is generating a first statistical model of the received collection of data. Since the amount of data in the class of interest exceeds that of any other class in the data, the number of feature vectors unique to the class of interest exceed those of any other class of data in the collection. This results in a model that is weighted in favor of the class of interest, which is a key point in the present method. The model is any suitable statistical model such as a Gaussian Mixture Model (GMM), a histogram, and any other equivalent statistical model. In the preferred embodiment of the present invention, a GMM is used. The GMM is mathematically described in U.S. Pat. No. 6,411,930 B1, entitled "DISCRIMINATIVE GAUSSIAN MIXTURE MODELS FOR SPEAKER VERIFICATION," which is hereby incorporated by reference into the specification of the present invention.

In a speaker recognition application, the first statistical model for the collection of data is generated using feature vectors x composed of a user-definable number of features in the data. In the preferred embodiment for speaker recognition, the first statistical model is a GMM model which produces a set of mean vectors $\mu_i$, and a set of covariance matrices $C_i$, and a set of weights $W_i$ from the feature vectors. For each i, these parameters specify a Gaussian density which models some aspect of speech. The weights $W_i$ are proportional to the number of feature vectors used to compute $\mu_i$. However, other statistical measures and estimate may be used to generate the first statistical model. The average of the weights $W_i$ for the class of interest will be much greater than the average of the set of weights $W_i$ for any of the other classes of data in the received collection of data. The GMM is a weighted sum of Gaussian densities, where the weights $W_i$ sum to unity.

The third step 3 of the method is selecting a user-definable number of subsets of the received collection of data. In the preferred embodiment for speaker recognition, each subset is a 3 seconds long data segments, but any other suitable time period is possible.

The fourth step 4 of the method is scoring each subset of the received collection of data using the first statistical model generated in the second step 2. Since the number of feature vectors of the class of interest exceeds that of any other class in the collection of data, the Gaussian densities corresponding to the class of interest will be more heavily weighted in the first statistical model than those of the other classes. Therefore, segments from the class of interest should score higher than those of the other classes. In the preferred embodiment, scoring is accomplished as follows:

$$\text{score(subset)} = \frac{1}{L}\sum_{j=1}^{L} \log\frac{f(x_j)}{f_n(x_j)},$$

where L is a number of the feature vectors $x_j$ within the subset, $f_n(x_j)$ is a value for feature vector $x_j$ scored against an empirically derived model for background classes, and $f(x_j)$ is a value for feature vector $x_j$ in the subset according to the first statistical model of the received collection of data.

The fifth step 5 of the method is selecting a user-definable set of scores from the result of the fourth step 4. In the preferred embodiment, the scores are selected by retaining the top, or highest scoring, 5% of the scores; discarding the bottom, or lowest scoring, 5% of the scores; and retaining the scores in the remaining 90% of the scores that are above a user-definable threshold T. In the preferred embodiment, T is as follows:

$$T = \text{Min} + p(\text{Max} - \text{Min}),$$

where Min is the minimum score within the remaining 90% of scores, Max is the maximum score within the remaining 90% of scores, and p is a user-definable value in the range of $0 \leq p \leq 1$. The threshold T is used to minimize the effects of variations in transmission channels over which the collection of data was received on the resulting model of the present invention. This is accomplished by making T a function of the characteristics of the transmission channel. As the characteristics of the transmission channel change, so will the subset scores. Since T is dependent on the subset scores, T will change as the characteristics of the transmission channel change.

The sixth step 6 of the method is identifying the subsets in the received collection of data that correspond to the scores selected in the fifth step 5.

The seventh step 7 of the method is combining the subsets identified in the sixth step 6. In the preferred embodiment, the identified subsets are concatenated in the order they appear in the received collection of data. However, any other suitable combination method may be employed in the present method.

The eighth, and final, step 8, of the method is generating a second statistical model of the subsets combined in the seventh step 7. The second statistical model is used as the model of the class of interest in the received collection of data. The second statistical model is generated in similar fashion as was the first statistical model, except only those subsets which scored sufficiently high in the fourth step 4 and are selected in the fifth step 5 are used rather than data contaminated with data of multiple classes. The second statistical model is used as a model of the class of interest. It includes only high scoring subsets from the received collection of data that are presumed to be of the class of interest. Therefore, the second statistical model is less contaminated than the first statistical model, which includes subsets from multiple classes. The first statistical model was constructed in a manner similar to how prior art methods construct a model of a speaker of interest. The second statistical model will produce better results in applications involving a class of interest than would the first statistical model.

The second statistical model is a GMM, a histogram, or any other suitable or equivalent statistical model. In the preferred embodiment for speaker recognition, the second statistical model is a GMM generated in the same manner as was the first statistical model above, but using only the subsets of the received collection of data that scored in the top 5% and above the threshold T.

Figure 2:
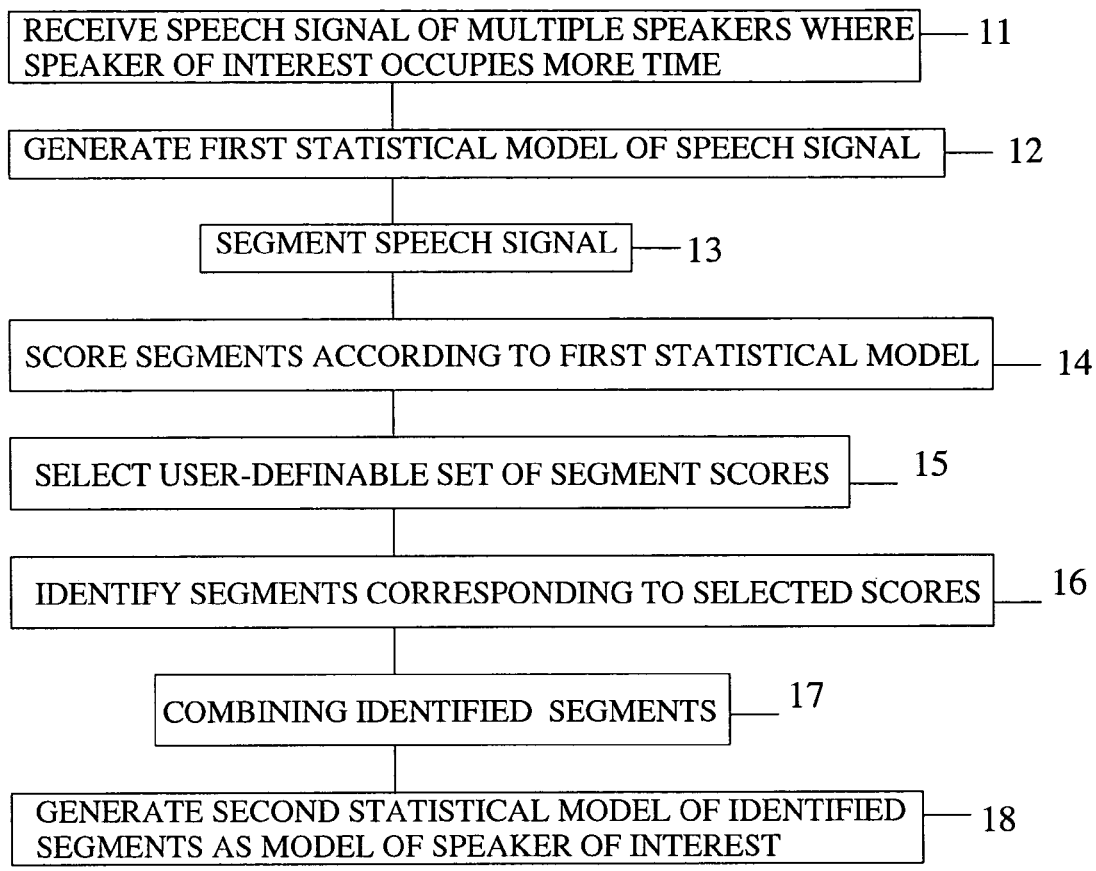
FIG. 2 is a list of the steps of the present invention as applied to data containing multiple speakers.

FIG. 2 is a list of steps of the present method as applied to speaker recognition.

The first step 11 of the method is receiving a speech signal that includes speech from the speaker of interest and one or more other speakers. However, the amount of time that the speaker of interest speaks must exceed that of the other speakers.

The second step 12 of the method is generating a first statistical model of the received speech signal. Since speech from the speaker of interest appears more frequently in the signal being modeled, feature vectors unique to the speaker of interest occur more frequently than do feature vectors of any other speaker. This results in a model which is weighted in favor of the speaker of interest, which is a key point in the present method. The model is any suitable statistical model such as a Gaussian Mixture Model (GMM), a histogram, and any other equivalent statistical model. In the preferred embodiment of the present invention, a GMM is used.

The first statistical model for the speech signal is generated using feature vectors x composed of a user-definable number of features (i.e., cepstral features, delta cepstral features, and delta-delta cepstral features) in the speech signal. In the preferred embodiment, 19 cepstral features and 19 delta cepstral features are computed every 10-20 milliseconds (msec.) sampling period. However, other numbers of cepstral features, types of cepstral features, and sample periods are possible. In the preferred embodiment, the first statistical model consists of a set of mean vectors $\mu_i$, a set of covariance matrices $C_i$, and a set of weights $W_i$ computed from the feature vectors. The weights $W_i$ are proportional to the number of feature vectors used in computing $\mu_i$. For each i, $\mu_i$, $C_i$, and $W_i$ are thought to represent a vocal tract configuration of a speaker. However, other statistical measures and estimate may be used to generate the first statistical model. The average of the set of weights $W_i$ for the speaker of interest will be much greater than the average of the set of weights $W_i$ for any of the other speakers in the received speech signal.

The third step 13 of the method is segmenting the received speech signal. In the preferred embodiment, each segment is 3 seconds long, but any other suitable time period is possible.

The fourth step 14 of the method is scoring each segment of the received speech signal using the first statistical model generated in the second step 12. Since the feature vectors of the speaker of interest should occur more frequently in the signal and be more heavily weighted in the first statistical model than those of the other speakers, segments from the speaker of interest should score higher than those of the other speakers. In the preferred embodiment, scoring is accomplished as follows:

$$\text{score(segment)} = \frac{1}{L} \sum_{j=1}^{L} \log \frac{f(x_j)}{f_n(x_j)},$$

where L is a number of the non-overlapping feature vectors $x_j$ within the segment, $f_n(x_j)$ is a value for feature vector $x_j$ scored against an empirically derived model for background speakers, and $f(x_j)$ is a value for feature vector $x_j$ in the segment according to the first statistical model of the received speech signal.

The fifth step 15 of the method is selecting a user-definable set of scores from the result of the fourth step 14. In the preferred embodiment, the scores are selected by retaining the top, or highest scoring, 5% of the scores; discarding the bottom, or lowest scoring, 5% of the scores; and retaining the scores in the remaining 90% of the scores that are above a user-definable threshold T. In the preferred embodiment, T is as follows:

$T=\text{Min}+p(\text{Max}-\text{Min})$, where Min is the minimum score within the remaining 90% of scores, Max is the maximum score within the remaining 90% of scores, and p is a user-definable value in the range of $0 \leq p \leq 1$. The threshold T is used to minimize the effects of variations in transmission channels over which the speech signal was received on the resulting model of the present invention. This is accomplished by making T a function of the characteristics of the transmission channel. As the characteristics of the transmission channel change, so will the segment scores. Since T is dependent on the segment scores, T will change as the characteristics of the transmission channel change.

The sixth step 16 of the method is identifying the segments in the received speech signal that correspond to the scores selected in the fifth step 15.

The seventh step 17 of the method is combining the segments identified in the sixth step 16. In the preferred embodiment, the identified segments are concatenated in the order they appear in the received speech signal. However, any other suitable combination method may be employed in the present method.

The eighth, and final, step 18, of the method is generating a second statistical model of the segments combined in the seventh step 17. The second statistical model is used as the model of the speaker of interest in the received speech signal. The second statistical model may then be used for speaker recognition. In the preferred embodiment, the second statistical model is generated in similar fashion as was the first statistical model, except only those segments which score sufficiently high in the fourth step 14 and are selected in the fifth step 15 are used rather than a signal contaminated with speech from multiple speakers. The second statistical model is used as a model of the speaker of interest. It includes only high scoring speech segments from the received speech signal that are presumed to be of the speaker of interest. Therefore, the second statistical model is less contaminated than the first statistical model, which includes segments of speech from multiple speakers. The first statistical model was constructed in a manner similar to how prior art methods construct a model of a speaker of interest. The second statistical model will produce better results in speech applications involving a speaker of interest than would the first statistical model.

The second statistical model is a GMM, a histogram, or any other suitable or equivalent statistical model. In the preferred embodiment, the second statistical model is a GMM generated in the same manner as was the first statistical model above, but using only the segments of the received speech signal that scored in the top 5% and above the threshold T. That is, the second statistical model for the segments identified in the seventh step 17 is generated using feature vectors x composed of a user-definable number of cepstral features and a user-definable number of delta cepstral features in the identified segments. In the preferred embodiment, 19 cepstral features and 19 delta cepstral features are computed every 10-20 milliseconds (msec.) sampling period. However, other numbers of cepstral features, number of delta cepstral features, and sample periods are possible. In the preferred embodiment, the second statistical model consists of a set of mean vectors $\mu_i$, a set of covariance matrices $C_i$, and a set of weights $W_i$ computed from the feature vectors. The weights $W_i$ are proportional to the number of feature vectors used in computing $\mu_i$. For each i, $\mu_i$, $C_i$, and $W_i$ represent a vocal tract configuration of the speaker of interest. However, other statistical measures and estimate may be used to generate the second statistical model.

What is claimed is:

1. A method of modeling a single speaker from multi-speaker data, comprising the steps of:
   (a) receiving a speech signal that includes speech from multiple speakers in which speech from the single speaker accounts for more time than does speech from any other speaker;

(b) generating a first statistical model of the received speech signal;
(c) segmenting the received speech signal;
(d) scoring each segment of the received speech signal using the first statistical model;
(e) selecting a user-definable set of scores from step (d);
(f) identifying the segments in the received speech signal that correspond to the scores selected in step (e);
(g) combining the segments identified in step (f); and
(h) generating a second statistical model of the segments combined in step (g) as the model of the single speaker.

2. The method of claim 1, wherein the step of generating a first statistical model of the received speech signal is comprised of the step of generating a first statistical model of the received speech signal using a statistical modeling method selected from the group of statistical modeling methods consisting of a Gaussian Mixture Model, a histogram, any other suitable statistical modeling method, and any other equivalent statistical modeling method.

3. The method of claim 2, wherein the step of generating a first statistical model is comprised of generating a first statistical model using a sampling period of 20 msec., 19 cepstral features and 19 delta cepstral features.

4. The method of claim 1, wherein the step of segmenting the received speech signal is comprised of the step of segmenting the received speech signal into 3 second segments.

5. The method of claim 1, wherein the step of scoring each segment of the received speech signal using the first statistical model is comprised of the step of scoring each segment of the received speech signal as follows:

$$\text{score(segment)} = \frac{1}{L}\sum_{j=1}^{L} \log \frac{f(x_j)}{f_n(x_j)},$$

where L is a number of consecutive feature vectors $x_j$ in the segment, $f_n(x_j)$ is a value for feature vector $x_j$ in the segment according to an empirically derived model for background speakers, and $f(x_j)$ is a value for feature vector $x_j$ in the segment according to the first statistical model of the received speech signal.

6. The method of claim 1, wherein the step of selecting a user-definable set of scores from step (d) is comprised of the following steps:
(a) selecting the highest 5% of the scores;
(b) discarding the lowest 5% of the scores; and
(c) selecting the scores between the highest 5% of the scores and the lowest 5% of the scores that are above a user-definable threshold T.

7. The method of claim 6, wherein the step of selecting the scores between the highest 5% of the scores and the lowest 5% of the scores that are above a user-definable threshold T is comprised of the step of selecting the scores between the highest 5% of the scores and the lowest 5% of the scores that are above the following threshold T:

$T=\text{Min}+p(\text{Max}-\text{Min})$, where Min is the minimum score of the scores between the highest 5% of the scores and the lowest 5% of the scores, Max is the maximum score of the scores between the highest 5% of the scores and the lowest 5% of the scores, and p is a user-definable value in the range of $0 \leq p \leq 1$.

8. The method of claim 1, wherein the step of combining the segments identified in step (f) is comprised of the step of concatenating the identified segments in the order the identified segments appear in the received speech signal.

9. The method of claim 1, wherein the step of generating a second statistical model of the segments combined in step (g) as the model of the single speaker is comprised of the step of generating a second statistical model of the segments combined in step (g) as the model of the single speaker using a statistical modeling method selected from the group of statistical modeling methods consisting of a Gaussian Mixture Model, a histogram, any other suitable statistical modeling method, and any other equivalent statistical modeling method.

10. The method of claim 9, wherein the step of generating a second statistical model is comprised of the step of generating a second statistical model using a sampling period of 20 msec., 19 cepstral features and 19 delta cepstral features.

11. A method of modeling a single speaker from multi-speaker data, comprising the steps of:
(a) receiving a speech signal that includes speech from multiple speakers in which speech from the single speaker accounts for more time than does speech from any other speaker;
(b) generating a first statistical model of the received speech signal;
(c) segmenting the received speech signal;
(d) scoring each segment of the received speech signal using the first statistical model:
(e) selecting a user-definable set of scores from step (d) as follows:
  a. selecting the highest 5% of the scores;
  b. discarding the lowest 5% of the scores; and
  c. selecting the scores between the highest 5% of the scores and the lowest 5% of the scores that are above a user-definable threshold T, where T is as follows:

$T=\text{Min}+p(\text{Max}-\text{Min})$ where Min is the minimum score of the scores between the highest 5% of the scores and the lowest 5% of the scores, Max is the maximum score of the scores between the highest 5% of the scores and the lowest 5% of the scores, and p is a user-definable value in the range of $0 \leq p \leq 1$;
(f) identifying the segments in the received speech signal that correspond to the scores selected in step (e);
(g) combining the segments identified in step (f); and
(h) generating a second statistical model of the segments combined in step (g) as the model of the single speaker.

* * * * *